United States Patent
Komarek

[11] 3,907,485
[45] Sept. 23, 1975

[54] SEGMENTED BRIQUETTING ROLL STRUCTURE

[75] Inventor: Karl R. Komarek, Chicago, Ill.

[73] Assignee: K. R. Komarek, Inc., Elk Grove Village, Ill.

[22] Filed: May 17, 1974

[21] Appl. No.: 470,811

Related U.S. Application Data

[62] Division of Ser. No. 338,272, March 5, 1973, Pat. No. 3,830,612.

[52] U.S. Cl. ............... 425/470; 249/117; 425/237; 425/471
[51] Int. Cl.² ............................................ B29C 1/00
[58] Field of Search ........... 425/237, 471, 470, 335, 425/363; 29/118, 119; 249/139, 117

[56] References Cited
UNITED STATES PATENTS

| 538,475 | 4/1895 | Albrecht | 425/237 X |
|---|---|---|---|
| 2,945,259 | 7/1960 | Decker et al. | 425/237 X |
| 2,958,902 | 11/1960 | Decker et al. | 425/237 X |
| 2,958,903 | 11/1960 | Decker | 425/237 X |
| 3,302,592 | 2/1967 | Werner | 425/471 |

Primary Examiner—Robert L. Spicer, Jr.
Attorney, Agent, or Firm—Finnegan, Henderson, Farabow and Garrett

[57] ABSTRACT

A briquetting press roll comprising a roll frame which retains a plurality of replaceable mold segments. The mold segments have a top working surface of a hard, highly wear-resistant material and a bottom surface opposite the top surface. Two opposite end walls connect the top working surface and the bottom surface, which end walls diverge with respect to each other from the bottom surface. Two opposite side walls also connect the top working surface and the bottom surface. The side walls include means for detachably connecting the mold segments to the briquetting roll frame and for restraining the segments from movement relative to the frame during briquetting operations.

11 Claims, 5 Drawing Figures

SEGMENTED BRIQUETTING ROLL STRUCTURE

This is a division of application Ser. No. 338,272, filed Mar. 5, 1973, now U.S. Pat. No. 3,830,612.

This invention relates to mold segments for use in briquetting rolls. The present invention also pertains to briquetting rolls comprising a plurality of replaceable mold segments.

Briquetting of various types of materials such as charcoal and the like has been done for many years. Briquetting roller presses employing two cooperating rollers, geared together for mutually opposed rotation, are well known. The use of roller wheels comprising a number of replaceable mold segments having surfaces provided with mold cavities for receiving the material to be briquetted, is also well known.

In recent years, briquetting techniques have been extended to include briquetting of such materials as iron ore, metal chips and turnings, etc. Briquetting of such materials requires the use of high pressure and often high temperature. High pressure between briquetting rolls and the maintenance of high pressure at elevated temperatures causes increased wear on the briquetting rolls. Such increased wear necessitates more frequent replacement of worn-out or broken mold segments.

The need for more frequent replacement of mold segments makes desirable briquetting rolls in which worn-out mold segments may be removed and replaced readily. However, to retain proper alignment of the mold cavities in cooperating rolls, it is important that the mold segments be rigidly retained in the press roll frame during briquetting operations. Desirably, mold segments are readily replaceable while being constrained from moving relative to the briquetting press roll frame. The mold segments must be retained from movement about the circumference of the press roll frame, from motion in an axial direction relative to the press roll frame, and from rotational movement within the press roll frame.

As previously noted, the use of briquetting rolls consisting of a multiplicity of mold segments has long been known in the art. For example, U.S. Pat. No. 538,475, issued in 1895, discloses a briquetting roll design comprising a plurality of mold segments. Similarly, U.S. Pat. No. 915,332, issued in 1909, discloses a briquetting roll design which comprises in effect, a continuous ring divided into a number of sections which are restrained from rotation relative to the roll shaft by set screws. Numerous patents have been granted since then for various segmented roll designs.

Many briquetting roll designs are intended to provide a structure, using conventional materials of construction, in which the mold segments can be changed or replaced more readily than a solid roll. For example, Decker, U.S. Pat. No. 2,945,259 discloses segments of cast iron or steel which are bolted to the periphery of a shaft.

The present invention provides a briquetting roll in which worn mold segments can easily be replaced. However, while this is a desirable feature of the design, it is not the only, or even the fundamental advantage of the design. The design of the present invention also provides a practical means for utilizing materials of construction that are too hard, too difficult, or too costly to fabricate into solid rolls. Additionally, the present design provides a roll structure which is suitable for use at high temperatures and provides a means for supporting the mold segments in such a manner that breakage is reduced. Breakage is reduced whether the segments are fabricated of conventional tool steel or such materials as metal carbide, dense alumina, silicon carbide, etc.

SUMMARY OF THE INVENTION

The briquetting rolls of the present invention are made up of a roll frame and a plurality of mold segments. In use, the briquetting roll includes a number of adjacent segments uniformly spaced on the circumference of the roll frame. Cavities are machined into the frame to receive mold segments. The segments and cavities are shaped so as to prevent the segments from shifting or sliding relative to the frame. The segments may be press-fitted or shrink fitted into the cavities. Alternatively, the segments may be designed to slide into the cavities and held in place by set screws or similar means.

The mold segments of the present invention comprise a top working surface of a hard, highly wear-resistant material. The top working surface has the general shape of a segment of the annular surface of a cylinder so that a plurality of segments may be fitted together to form a cylindrical working surface. Normally the surface of each segment has at least a portion of one mold cavity therein. Preferably, the segments have a flat or planar bottom surface opposite the top surface.

Two opposite end walls connect the top working surface and the bottom surface. The end walls, which intersect with the top working surface transverse to the curved surface, diverge with respect to each other from the bottom surface. The top and bottom surfaces of the segments are also connected by two opposite side walls. The side walls include means for detachably connecting the segments to a briquetting roll frame. The means restrain the segment from moving relative to the frame during briquetting operations.

In accordance with one embodiment of the invention, the side walls may be perpendicular to the top and bottom surfaces of the segment. In such an embodiment, the means for connecting the segments to the roll frame preferably comprise, at least in part, portions of the side walls which are not in a common plane perpendicular to the axis of the cylinder section defining the top working surface.

In accordance with another embodiment, the side walls may diverge with respect to each other from the bottom surface. The side walls should not converge with respect to each other from the bottom surface.

The present invention also comprises a briquetting press roll comprising the combination of a roll frame and a plurality of mold inserts or segments. The roll frame comprises a generally cylindrical core having a pair of integral flanges extending around the periphery of the cylindrical core. The interior surfaces of the flanges contain a number of indentations or outwardly projecting portions. The roll frame also comprises a plurality of surfaces around the circumference of the core between the flanges, each of which surfaces is not of a uniform radial distance from the axis of the core. Preferably, the surfaces are flat or planar, forming a polygon about the circumference of the core. A plurality of the previously described mold segments fit between the flanges about the circumference of the core. Each mold segment comprises a body having a bottom portion which mates with a surface on the core. Similarly, the means on side walls of the segments for connecting the segments to the roll frame mate with the projections or indentations on the interior surface of the flanges. The mating surfaces restrain the segments from moving about the circumference of the core.

DESCRIPTION OF THE PREFERRED EMBODIMENTS

Figure 1:
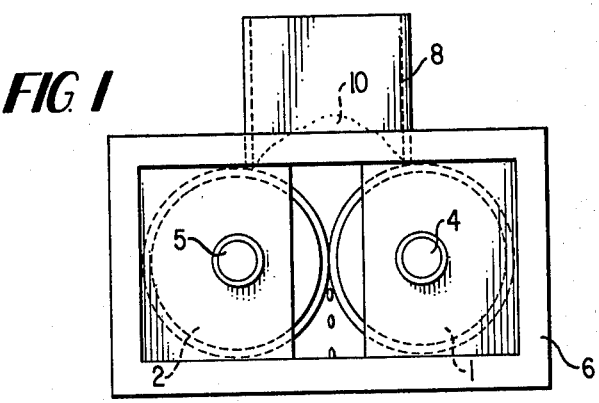
FIG. 1 shows schematically, a lateral view of a briquetting roller press.

The mold segments and press rolls of the present invention are employed in briquetting roller presses. The briquetting roller press schematically shown in FIG. 1 comprises two press rolls 1 and 2 mounted on respective shafts 4 and 5 which extend parallel to each other. The shafts are mounted on a frame structure 6. Press roll 1 is driven in a counter clockwise direction while press roll 2 is driven in a clockwise direction by gears and a drive motor (not shown). Located midway between the two press rolls 1 and 2 is a feed hopper 8 represented in a simplified manner. The feed hopper contains the material to be briquetted 10 which is compressed into briquettes between the two press rolls as they turn in mutually opposed rotation. The press rolls and the mold segments are shown in greater detail in FIGS. 2–5.

Figure 2:
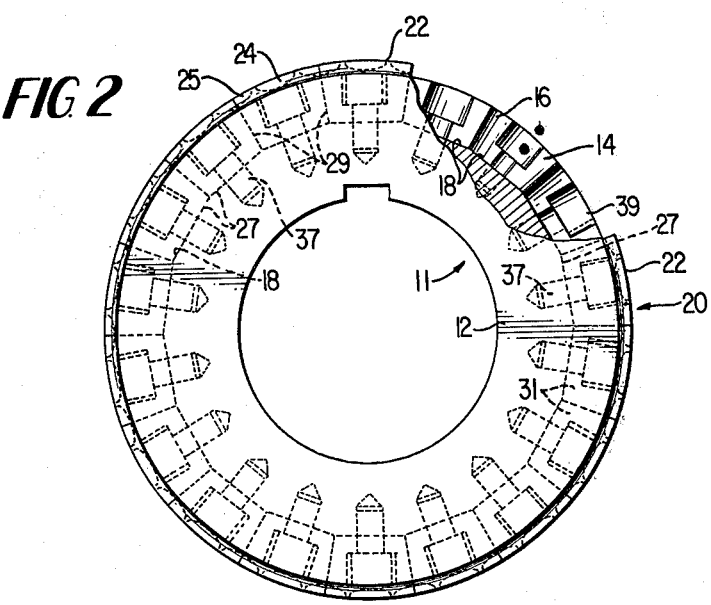
FIG. 2 is a side view of a briquetting press roll structure, with a portion broken away for purposes of clarity in accordance with one embodiment of the present invention.
Figure 3:
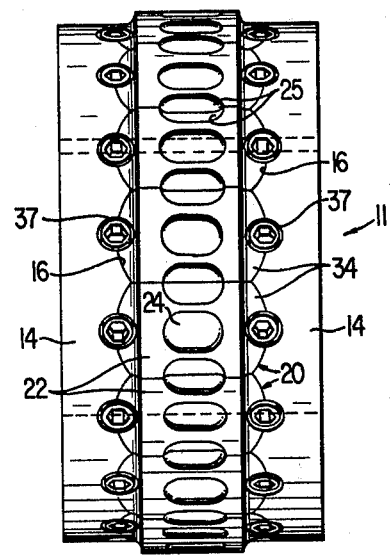
FIG. 3 is an end view of a briquetting roll structure of FIG. 2.
Figure 5:
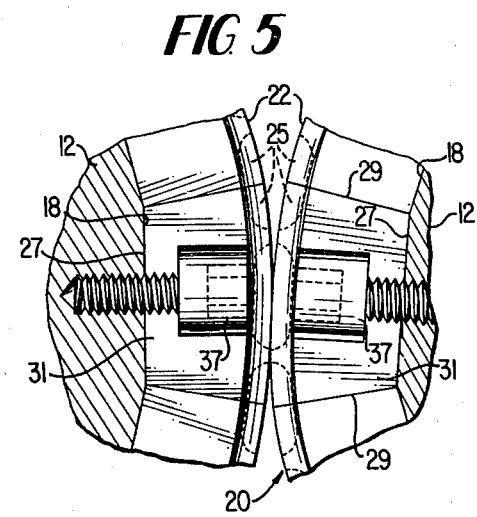
FIG. 5 shows a portion of mating briquetting press rolls partly in section.
Figure 4:
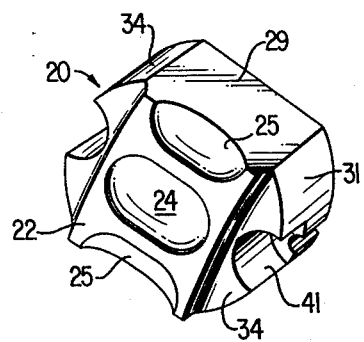
FIG. 4 is a perspective view of a mold segment for use in the briquetting roll of FIGS. 2 and 3.

The briquetting press roll of the present invention comprises a combination of a roll frame and a plurality of mold inserts. As embodied in the drawings, the roll frame, generally 11, comprises a cylindrical core 12 having a pair of integral flanges 14 extending around the periphery of the cylindrical core. The integral flange is best illustrated in FIG. 2 in this view; the top flanges have been broken away, and the mold insert removed in the broken portion, for purposes of clarity. As here embodied, the interior surfaces of the flanges 14 contain a number of indentations 16. In accordance with the embodiment of the drawings, the roll frame also comprises a plurality of flat or planar surfaces 18 around the circumference of the core between the flanges. The flat surfaces form a polygon about the circumference of the core.

The briquetting rolls of the present invention include a plurality of segments which fit into cavities between the flanges of the roll frame. The mold segments have a top working surface of a hard, highly wear-resistant material.

In the embodiment of FIGS. 2–5, the mold segments, generally 20, have a top working surface 22 which is generally in the shape of a segment of the annular surface of a cylinder. Normally, the top working surface has a portion of at least one mold cavity therein. In the preferred embodiment shown in the drawings, each segment has at least one complete mold cavity 24 and two half-mold cavities 25. Two half-mold cavities in adjacent segments mate to form a full-mold cavity.

Opposite the top working surface, the mold segments of the present invention have a bottom surface which may be planar or concave to form an uninterrupted surface. The bottom working surface resists the compressive stresses which are imposed on the mold segments when the briquettes are formed. In accordance with the preferred embodiment shown in the drawings, the mold segments have a bottom surface 27 which is entirely flat or planar. Preferably, bottom surface 27 is in the same plane throughout substantially the entire area between the end and side walls.

In accordance with other embodiments (not shown) the bottom surface may be concave. In such an embodiment, the bottom surface is not concentric or coaxial with the top working surface.

The mold segments of the present invention also have two opposite end walls connecting the top working surface and the bottom working surface. The end walls diverge with respect to each other from the bottom surface. In the embodiment shown in the drawings, end walls 29 are flat and normal to the curve of top working surface. In such an embodiment, end walls 29 lie in planes radiating out from the center line or axis of the cylinder section defining the top working surface. In the embodiment depicted in the drawings, these end walls 29 of the segments abut against each other when the segments are in place in the roll frame so as to offer mutual support. It will be appreciated that the end walls 29 may have a gap between them to allow for expansion when the rolls are used to compress hot materials.

The top and bottom surfaces of the mold segments are also connected by two opposite side walls. The side walls have means for detachably connecting the segments to a briquetting roll frame and for restraining the segments from moving relative to the frame during briquetting operations.

In accordance with the preferred embodiment of the present invention illustrated in the drawings, side walls 31 are perpendicular to the top and bottom surfaces of the segment. In accordance with another embodiment of the present invention, the side walls may diverge with respect to each other from the bottom surface.

In the present embodiment, the means for detachably connecting the segments to a briquetting roll frame and for restraining the segments from moving relative to the frame during briquetting operations, comprises projections 34 in the shape of a cylinder segment. It will be appreciated that the means for connecting the segments to a briquetting roll frame and for restraining the segments from moving relative to the frame may comprise a member of any shape which is capable of cooperating with properly shaped surfaces on the interior of integral flanges of a roll frame to restrain the segment from moving during operation. The means for connecting the segments to the briquetting roll frame and restraining the segments from moving relative to the frame during briquetting operations may comprise projections in a form of a segment of a cone, a V-shaped projection, a spline, etc. or a concave portion in the side walls. Suitable means typically comprise portions of the side wall which are not in a common plane perpendicular to the axis of the cylindrical section defining the top working surface. Stated in another manner, the connecting means comprises at least portions which are not in a common plane, which plane is perpendicular to the top and bottom surfaces.

The present invention also comprises a briquetting press roll comprising the combination of a roll frame and a plurality of mold inserts. The roll frame comprises a generally cylindrical core and a pair of integral flanges extending around the periphery of the core. A plurality of mold segments are held in place around the circumference of the core between the integral flanges.

In accordance with the embodiment depicted in the drawings, a plurality of mold segments 20 extend around the circumference of cylindrical core 12 of roll frame 11. Flat bottom surface 27 on the mold segments mate with flat surface 10 on the roll frame. Similarly, projections 34 of side walls 31 of the segments mate with indentations 16 in the integral flanges of the roll frame. In accordance with this embodiment, socket head cap screws 37 are provided to hold the segments against the roll frame. Screw 37 fit into recesses 39 and 41, in frame 11 and segment 20, respectively, so that the screw heads do not extend above top working surface 22. Projections 34 cooperate with indentations 16 to restrain the segments from moving relative to the roll frame. As is apparent, the segments are restrained from movement about the circumference of the roll frame, from motion in an axial direction relative to the roll frame, and from rotational movement within the roll frame. Socket head cap screws 37 assist in preventing the segments from rotational movement when the ends of the segments are rounded, as shown in the preferred embodiment of the drawings.

In accordance with other embodiments of the present invention, bottom surface 27 of the segments may be concave and mate with convex surfaces extending around the circumference of cylindrical core 12. In such an embodiment, the concave bottom surface is not concentric or coaxial with the cylindrical top working surface 22. Similarly, the convex surfaces around the circumference of core 11 between flanges 14 are not concentric or coaxial with cylindrical core 12. In accordance with additional embodiments of the present invention, the interior surfaces of integral flanges 14 may contain a plurality of outwardly projecting portions, rather than the indentations shown in the preferred embodiment of the drawings. In such an embodiment, the side walls 31 of the segments contain indentations which mate with the projections on the flanges. The mating surfaces of the segments and flanges serve to restrain the segment from movement relative to the core.

The segments and briquetting press roll of the present invention can be made in any convenient size. As a typical example, a device suitable for briquetting metal chips and turnings may employ 30 in. diameter press rolls and have a 300 ton roll separating force. The torque required to turn each of the rolls is about 500,000 lb. inches. The briquetting pressure based on the projected area of the briquette must be approximately 75,000 lb/sq. in. so that each briquette will have a projected area of not over 8 sq. in.

A roll structure satisfactory for these conditions will be comprised of 20 identical segments each having a circumferential pitch of 4.7 inches. The segments may be 6.7 inches in diameter across the two sides in a direction parallel with the axis of the roll shafts, and they may be 3 inches thick in the center. Each segment may be cut with two pockets or mold cavities measuring 2.1 in. by 3.8 in. long. A preferred arrangement is to have the split between segments through the center of a pocket so that each segment will have one complete pocket and two half pockets which will mate with the half pockets in adjoining segments.

The bottom sides of the segments which resist the briquetting load will have an area of 27 sq. in. so that the load in compression will be about 22,000 psi. The load bearing which prevents the segments from rotating relative to the shaft will be about 5,500 psi and the load in shear through the segments as a result of the torque necessary to turn the rolls is about 2,350 psi. It will be recognized by those skilled in the art that these values are suitable for a briquetting roll structure and at the same time such a structure provides for the economical utilization of materials of construction which form the segments.

The invention in its broader aspects is not limited to the specific details shown and described and departures may be made from such details without departing from the principles of the invention and without sacrificing its chief advantages.

What is claimed is:

1. A mold segment for a briquetting roll, having
   A. a top working surface of a hard, highly wear-resistant material;
   B. an uninterrupted bottom surface opposite said top surface;
   C. two opposite end walls connecting said top working surface and said bottom surface, said end walls diverging with respect to each other from said bottom surface; and
   D. two opposite side walls connecting said top working surface and said bottom surface, said side walls having means for detachably connecting said segments to a briquetting roll frame and for restraining said segments from moving relative to said frame during briquetting operations including projections extending outwardly from said side walls and at least one concave portion in said side wall to receive retaining means.

2. The mold segment of claim 1 in which said bottom surface is flat.

3. The mold segment of claim 1 in which said top working surface is the general shape of a segment of the annular surface of a cylinder and in which said bottom surface is concave, but not coaxial with said top working surface.

4. The mold segment of claim 1 in which said top working surface has the general shape of a segment of the annular surface of a cylinder and said end walls are transverse to the curved surface of the top surface.

5. The mold segment of claim 4 in which said end walls are normal to the curve of said top surface.

6. The mold segment of claim 1 in which said side walls are perpendicular to the top and bottom surfaces of said segment.

7. The mold segment of claim 1 in which said side walls diverge with respect to each other from said bottom surface.

8. The mold segment of claim 1 in which said means for detachably connecting said segments to the briquetting roll frame and for restraining said segments from moving relative to said frame during briquetting operations comprises portions of said side walls which are not in a common plane which plane is perpendicular to said top and bottom surfaces.

9. The mold segment of claim 1 in which said top working surface contains at least a portion of one mold cavity therein.

10. The mold segment of claim 9 in which said top working surface has one complete mold cavity and two half-mold cavities therein.

11. The mold segment of claim 1 in which said projections are in the shape of cylinder segments.

* * * * *